(12) United States Patent
Kaneyama

(10) Patent No.: US 6,215,925 B1
(45) Date of Patent: Apr. 10, 2001

(54) OPTICAL COMBINATION OF PHOTORECEPTOR AND OPTICAL FIBER

(75) Inventor: Yoshinobu Kaneyama, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 08/865,703

(22) Filed: May 30, 1997

(30) Foreign Application Priority Data

May 31, 1996 (JP) .................................................. 8-137868

(51) Int. Cl.$^7$ .................................................. G02B 6/32
(52) U.S. Cl. .................................. 385/35; 385/31; 385/33; 385/88
(58) Field of Search .................................. 385/15, 33, 35, 385/88, 89, 92, 93, 94, 31

(56) References Cited

U.S. PATENT DOCUMENTS

| | | | |
|---|---|---|---|
| 5,073,003 | * 12/1991 | Clark | 385/33 |
| 5,282,088 | * 1/1994 | Davidson | 385/35 X |
| 5,403,308 | * 4/1995 | Wood et al. | 385/35 X |
| 5,600,741 | * 2/1997 | Hauer et al. | 385/35 |
| 5,963,694 | * 10/1999 | Fujimura et al. | 385/88 |
| 6,115,521 | * 9/2000 | Tran et al. | 385/52 |

FOREIGN PATENT DOCUMENTS

| | | | |
|---|---|---|---|
| 2-64509 | 3/1990 | (JP) | 385/88 X |
| 3-263006 | 11/1991 | (JP) | 385/88 X |
| 5-273444 | 10/1993 | (JP) | 385/88 X |

* cited by examiner

*Primary Examiner*—Brian Healy
(74) *Attorney, Agent, or Firm*—Young & Thompson

(57) ABSTRACT

An optical combination of a photoreceptor and an optical fiber, in which a tip surface of the optical fiber and a photoreceiving surface of the photoreceptor is contacted to a surface of the spherical lens so that a light outgoing from the tip surface of the optical fiber into the spherical lens may be totally reflected repeatedly within the spherical lens so as to be incident on the photoreceiving surface of the photoreceptor, resulting in largely simplifying the optical positioning between the photoreceptor and the optical fiber without polishing the tip of the core of the optical fiber into a spherical or semispherical shape in an inexpensive manner.

3 Claims, 4 Drawing Sheets

OPTICAL COMBINATION OF PHOTORECEPTOR AND OPTICAL FIBER

BACKGROUND OF THE INVENTION

The present invention relates to an optical combination of a photoreceptor and an optical fiber.

DESCPRITION OF THE RELATED ART

FIG. 1 shows a conventional optical combination of a photoreceptor and an optical fiber, as disclosed in Japanese Patent Laid-Open Publication No. 5-273444. A photoreceptor 4 having a photoreceiving surface 5 is placed on a substrate 9 (X-Y plane) and an optical fiber 2 is arranged so that its axial direction (X direction) may be parallel with the photoreceiving surface 5 of the photoreceptor 4. A triangular condenser lens 7, with a right-angled triangular side cross section, having a reflecting surface 8 on its hypotenuse side is placed between one end surface of the optical fiber 2 and the photoreceiving surface 5 of the photoreceptor 4. In such a construction, an outgoing light from the end surface of the core of the optical fiber 2 is condensed by the condenser lens 7 and the light is reflected in the Z direction at right angles by the reflecting surface 8 of the condenser lens 7 so as to focus the light onto the photoreceiving surface 5 of the photoreceptor 4. As a result the photoreceptor 4 and the optical fiber are optically combined.

Other conventional optical combinations of this kind have been proposed, as disclosed in Japanese Patent Laid-Open publication Nos. 2-64509 and 3-263006, such that the tip of the core of an optical fiber is polished to form a spherical or semispherical lens.

However, in the conventional optical combination shown in FIG. 1, in order to focus the outgoing light from the end surface of the core of the optical fiber 2 accurately on the photoreceiving surface 5 of the photoreceptor 4, the optical fiber 2 must be exactly positioned in the X, Y and Z directions. Hence, for this positioning, the light is always outgoing from the end surface of the core of the optical fiber 2 so as to monitor a photoreceiving signal of the photoreceptor 4 and the optical fiber 2 must be exactly positioned in the X, Y and Z directions so that the power of the light may be maximum. Thus it takes much time for the positioning work and a production cost becomes high.

Further, as disclosed in Japanese Patent Laid-Open publication Nos. 2-64509 and 3-263006, in the case that the tip of the core of the optical fiber is polished to form the spherical or semispherical lens, similarly, the polishing is carried out so that the center of the sphere may be positioned on the light axis and its surface may be complete round. Hence, the production cost is raised.

SUMMARY OF THE INVENTION

Accordingly, it is an object of the present invention to provide an optical combination of a photoreceptor and an optical fiber in view of the aforementioned problems of the prior art, which is capable of simplifying a positioning of a photoreceptor and an optical fiber and carrying out the optical combination with inexpensive parts without polishing a tip of a core of the optical fiber into a spherical or semispherical shape.

In accordance with one aspect of the present invention, there is provided an optical combination of a photoreceptor and an optical fiber, comprising an optical fiber having a slant cut tip surface; a photoreceptor having a photoreceiving surface; and a spherical lens, the tip surface of the optical fiber and the photoreceiving surface of the photoreceptor being contacted to a surface of the spherical lens so that a light outgoing from the tip surface of the optical fiber into the spherical lens is totally reflected repeatedly within the spherical lens so as to be incident on the photoreceiving surface of the photoreceptor.

In the optical combination of a photoreceptor and an optical fiber, preferably an incident angle of the light incoming from the optical fiber into the spherical lens is determined so that the light totally reflected repeatedly within the spherical lens may be adapted to be incident on the photoreceiving surface of the photoreceptor before the light is returned to the contact surface between the optical fiber and the surface of the spherical lens.

Further, the incident angle of the light incoming from the optical fiber into the spherical lens can be determined so that a locus of the light repeating the total reflection within the spherical lens may not constitute a regular polygon.

BRIEF DESCRIPTION OF THE DRAWINGS

The objects, features and advantages of the present invention will become more apparent from the consideration of the following detailed description, taken in conjunction with the accompanying drawings, in which.

DESCRIPTION OF THE PREFERRED EMBODIMENTS

Figure 1:
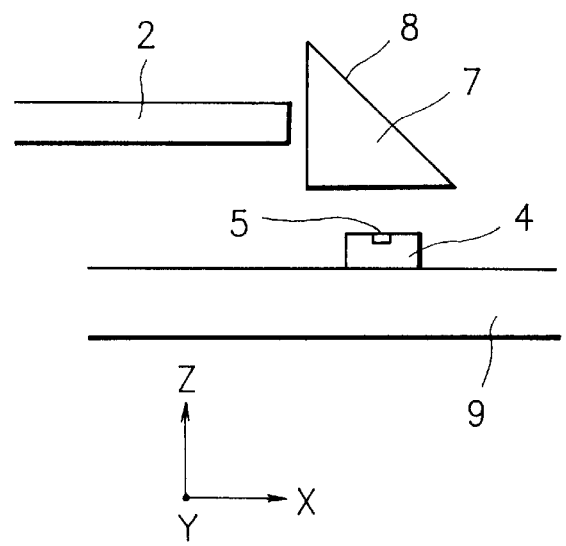
FIG. 1 is a schematic side view showing a conventional optical combination of a photoreceptor and an optical fiber.
Figure 2:
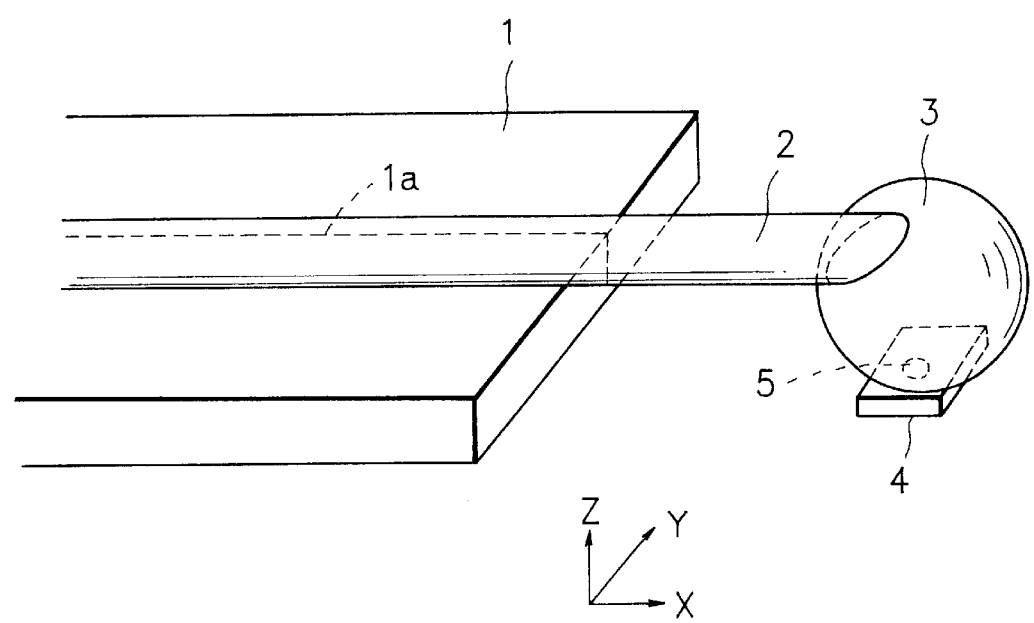
FIG. 2 is a perspective view showing an optical combination of a photoreceptor and an optical fiber according to one embodiment the present invention.
Figure 3:
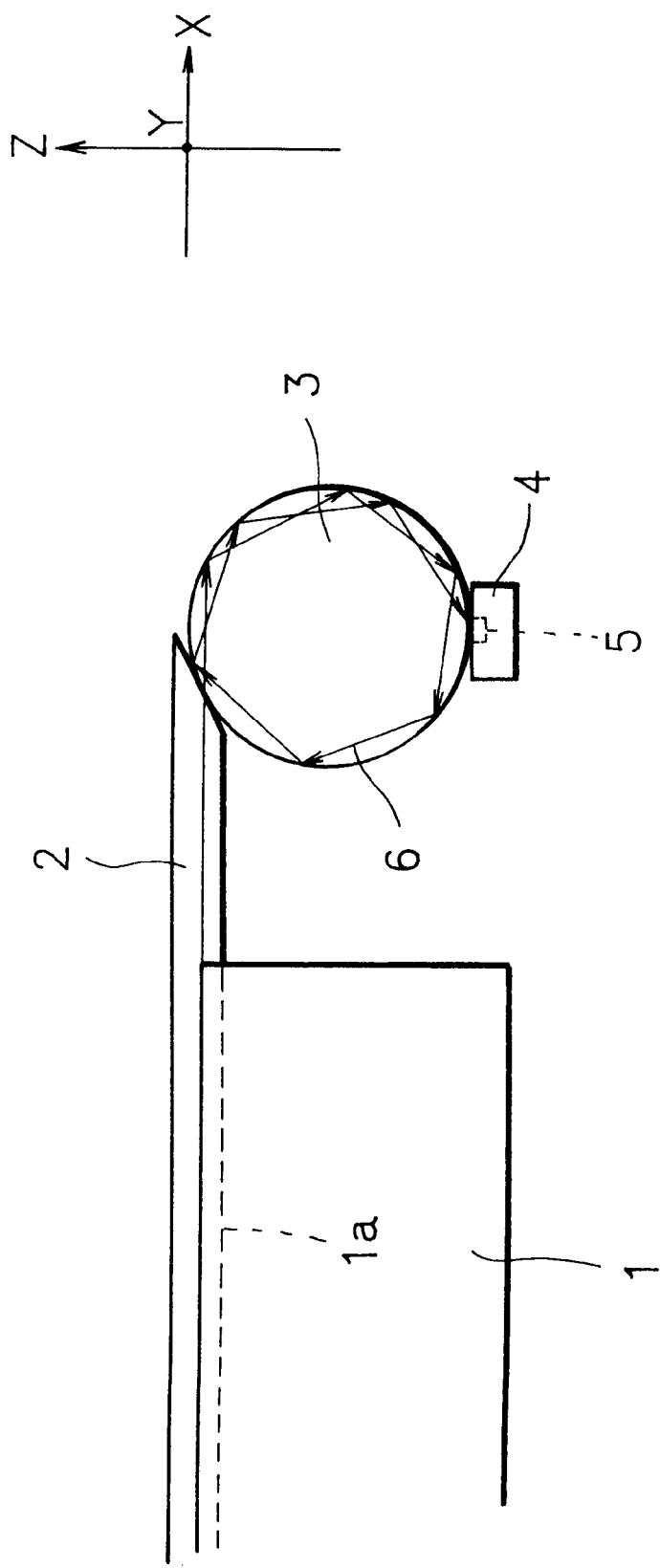
FIG. 3 is a side view of the optical combination shown in FIG. 2.
Figure 4:
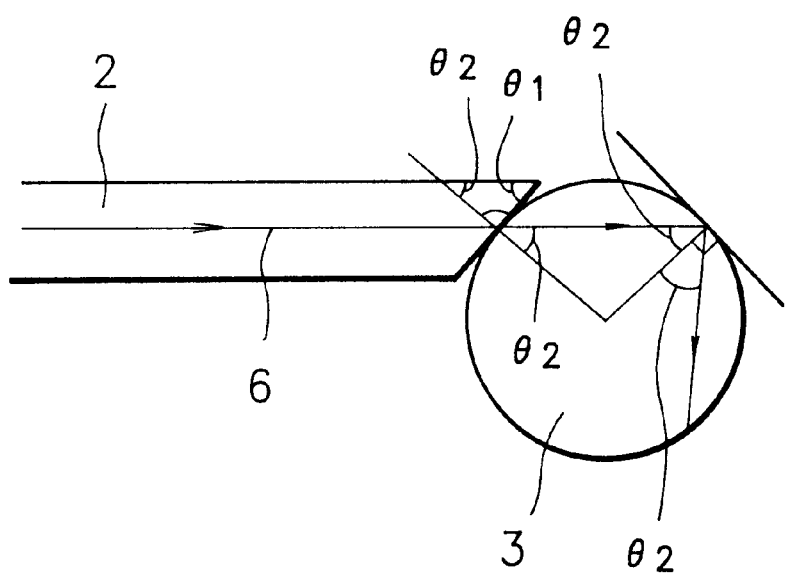
FIG. 4 is an explanatory side view showing an angle of reflection of a spherical lens shown in FIG. 2.
Figure 5:
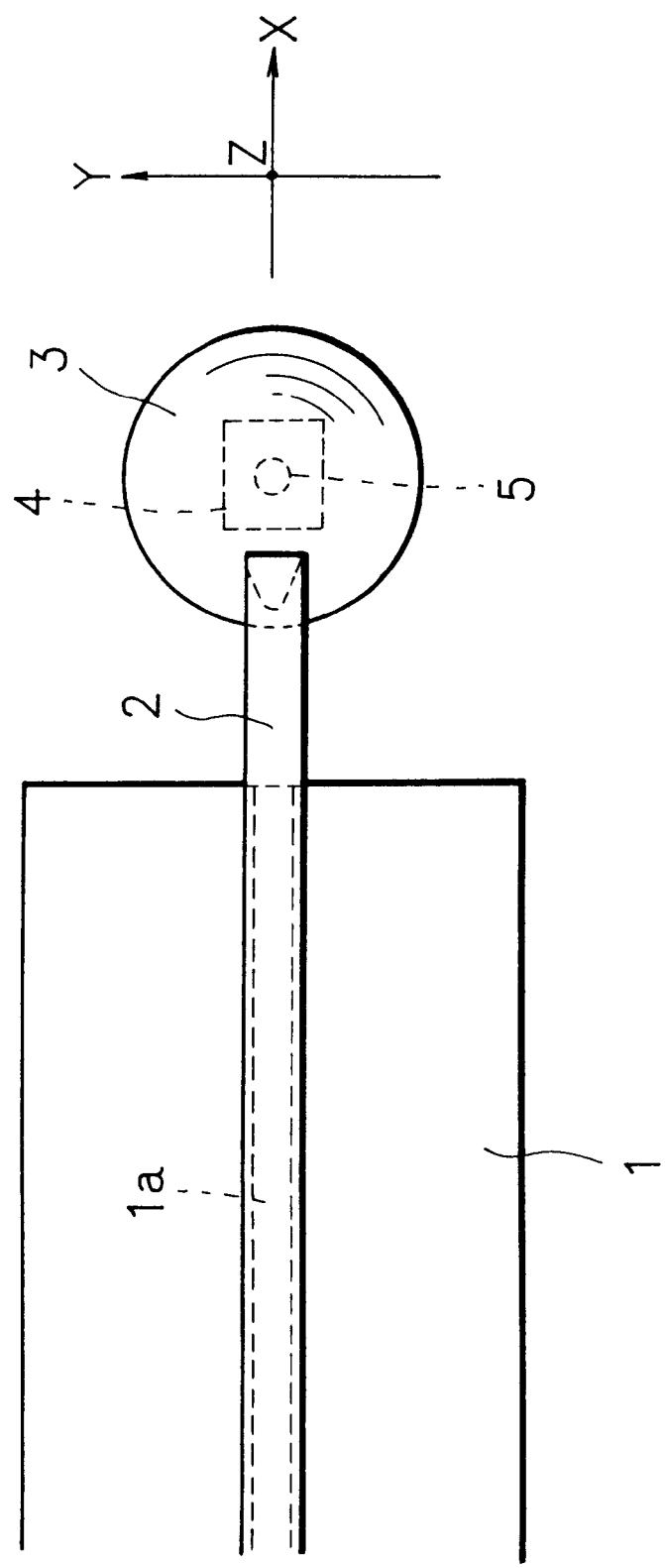
FIG. 5 is a top plan view of the optical combination shown in FIG. 2.

Referring now to the drawings, there is shown in FIG. 2 an optical combination of a photoreceptor and an optical fiber according to one embodiment of the present invention. FIG. 3 is a side view of the optical combination shown in FIG. 2, and FIG. 4 is an explanatory side view showing an angle of reflection of a spherical lens shown in FIG. 2. FIG. 5 is a top plan view of the optical combination shown in FIG. 2. The same parts as those of the conventional optical combination shown in FIG. 1 are designated by the same symbols.

As shown in FIGS. 2 to 5, an optical fiber 2 is positioned along a V-shaped groove 1a (X direction) of a substrate 1 and is secured thereon, and the tip of the optical fiber 2 is cut and polished obliquely. The substrate 1 made of a silicon (Si) substrate is formed with the V-shaped groove 1a by anisotropic etching, and hence the optical fiber 2 can be positioned in the X, Y and Z directions with high accuracy.

A spherical lens 3 is placed between the tip surface of the optical fiber 2 and a photoreceiving surface 5 of a photoreceptor 4 so that the slant tip surface of the optical fiber 2 and the photoreceiving surface 5 of the photoreceptor 4 may be contacted to the surface of the spherical lens 3 and as a result, the light incoming from the tip surface of the optical fiber 2 into the spherical lens 3 may be totally reflected by the spherical surface of the spherical lens 3 so as to be incident on the photoreceiving surface 5 of the photoreceptor 4.

In such a construction, in order to carry out the total reflection of the light incoming from the tip surface of the optical fiber into the spherical lens 3 by the internal spherical surface of the spherical lens 3, assuming that an angle of the tip surface of the optical fiber is $\theta_1$, the following formula must be satisfied:

$$\theta_1 \leq 90° - (\text{total reflection angle within spherical lens 3}) \quad (1)$$

This will be explained with reference to FIG. 4. Assuming that a reflection angle within the spherical lens 3 is $\theta_2$, the following formula is effected.

$$\theta_2 = 90° - \theta_1 \quad (2)$$

Now, in order to allow the light incoming from the tip surface of the optical fiber 2 into the spherical lens 3 to conduct the total reflection within the spherical lens 3, the following formula must be satisfied:

$$\theta_2 \geq (\text{total reflection angle}) \quad (3)$$

Hence, the formulas (2) and (3) are modified to obtain the following formula:

$$\theta_1 \leq 90° - (\text{total reflection angle}) \quad (4)$$

When the light repeating the total reflection within the spherical lens 3 returns to the contact surface between the tip surface of the optical fiber 2 and the spherical lens 3, the light escapes outside from this contact surface. Hence, it is necessary for the light repeating the total reflection within the spherical lens 3 not to return to the incoming surface of the light. In order to attain this situation, it is necessary that a locus 6 of the light repeating the total reflection within the spherical lens 3 does not constitute a regular polygon. That is, the following formula is satisfied:

$$2 \times \theta_2 \neq (n-2) \times 180°/n \quad (5)$$

In this case, however, n=a natural number of at least 3. Then, substitute formula (2) into formula (5), rearrange terms, and the following formula must be satisfied.

$$\theta_1 \neq 180°/n \quad (6)$$

The polishing angle $\theta_1$ of the tip surface of the optical fiber 2 must therefore satisfy formulas (4) and (6).

In this embodiment, although the tip surface of the optical fiber 2 and the photoreceiving surface 5 of the photoreceptor 4 are contacted to the surface of the spherical lens 3, the contact point between the tip surface of the optical fiber 2 and the surface of the spherical lens 3 may be in any position on an intersection line between the surface of the spherical lens 3 and a plane containing the following three points:

(1) the contact point between the tip surface of the optical fiber 2 and the surface of the spherical lens 3, (2) the contact point between the photoreceiving surface 5 of the photoreceptor 4 and the surface of the spherical lens 3, and (3) the center of the spherical lens 3.

Next, the operation of the foregoing optical combination will be described.

The light outgoing from the tip surface of the optical fiber 2 into the spherical lens 3 is shifted at an angle $\theta_2$ toward the center of the spherical lens 3 since the tip surface of the optical fiber is obliquely polished at an angle $\theta_1$. This light passes in the spherical lens 3 and is then reflected again at the angle $\theta_2$ by the surface of the spherical lens 3. In this case, the polishing angle $\theta_1$ is determined so that the angle $\theta_2$ may be larger than the total reflection angle, and hence the light is totally reflected by the surface of the spherical lens 3, resulting in repeating the total reflection within the spherical lens 3. In addition, the locus 6 of the light repeating the total reflection within the spherical lens 3 does not constitute a regular polygon and the polishing angle $\theta_1$ is determined so that the angle $\theta_2$ may be larger than the total reflection angle. Hence, even when the light makes a round within the spherical lens 3 by repeating the total reflection, the light returns to not its original position but a somewhat shifted position while repeating the total reflection. And while repeating the total reflection, the light is certain to income to the photoreceiving surface 5 of the photoreceptor 4.

In other words, in this embodiment, assuming that the direction of light axis of the optical fiber 2 is the X direction and the reflecting direction of the light within the spherical lens 3 is the Z direction and that the direction perpendicular to the X and Z directions is the Y direction, a positional adjustment of the optical fiber 2 in the X direction is unnecessary because the tip surface of the optical fiber 2 is simply contacted to the surface of the spherical lens 3. Regarding the Z direction, as long as the tip surface of the optical fiber 2 contacts the surface of the spherical lens 3, the optical combination can be accomplished at any position. Hence, only an adjustment in the Y direction is required, and the adjustment in the X, Y and Z directions is not necessary compared with the conventional example.

As described above, according to the present invention, a slant cut tip surface of an optical fiber and a photoreceiving surface of a photoreceptor are contacted to a surface of a spherical lens 3 so that the light outgoing from the tip surface of the optical fiber into the spherical lens may be totally reflected repeatedly within the spherical lens so as to be incident on the photoreceiving surface of the photoreceptor. As a result, the optical positioning between the photoreceptor and the optical fiber can be largely simplified and be readily carried out without polishing the tip of the core of the optical fiber into a spherical or semispherical shape, and thus the optical combination of the photoreceptor and the optical fiber can be attained in an inexpensive manner.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An optical combination of a photoreceptor and an optical fiber, comprising:

an optical fiber having a slant cut tip surface;

a photoreceptor having a photoreceiving surface; and a spherical lens, the tip surface of the optical fiber and the photoreceiving surface of the photoreceptor being contacted to a surface of the spherical lens so that a light outgoing from the tip surface of the optical fiber into the spherical lens is totally reflected repeatedly within the spherical lens so as to be incident on the photoreceiving surface of the photoreceptor.

2. An optical combination of a photoreceptor and an optical fiber as claimed in claim 1, wherein an incident angle of the light incoming from the optical fiber into the spherical lens is determined so that the light totally reflected repeatedly within the spherical lens is adapted to be incident on the photoreceiving surface of the photoreceptor before the light is returned to the contact surface between the optical fiber and the surface of the spherical lens.

3. An optical combination of a photoreceptor and an optical fiber as claimed in claim 2, wherein the incident angle of the light incoming from the optical fiber into the spherical lens is determined so that a locus of the light repeating the total reflection within the spherical lens does not constitute a regular polygon.

\* \* \* \* \*